United States Patent
Keuper et al.

(10) Patent No.: US 7,364,343 B2
(45) Date of Patent: Apr. 29, 2008

(54) COMPACT LIGHTING SYSTEM AND DISPLAY DEVICE

(75) Inventors: Matthijs Hendrik Keuper, San Jose, CA (US); Robert Frans Maria Hendriks, Eindhoven (NL)

(73) Assignee: Philips Lumileds Lighting Company LLC, San Jose, CA (US)

( * ) Notice: Subject to any disclaimer, the term of this patent is extended or adjusted under 35 U.S.C. 154(b) by 276 days.

(21) Appl. No.: 10/497,481

(22) PCT Filed: Dec. 5, 2002

(86) PCT No.: PCT/IB02/05243

§ 371 (c)(1),
(2), (4) Date: May 31, 2005

(87) PCT Pub. No.: WO03/048635

PCT Pub. Date: Jun. 12, 2003

(65) Prior Publication Data

US 2005/0231976 A1 Oct. 20, 2005

(30) Foreign Application Priority Data

Dec. 7, 2001 (EP) .................................. 01204754

(51) Int. Cl.
*F21V 7/09* (2006.01)
(52) U.S. Cl. ...................... 362/628; 362/615; 362/623

(58) Field of Classification Search ................ 362/26, 362/27, 600–634, 559–561; 349/61–67; 40/546, 547
See application file for complete search history.

(56) References Cited

U.S. PATENT DOCUMENTS

| | | | | |
|---|---|---|---|---|
| 5,485,354 A | * | 1/1996 | Ciupke et al. | ............... 362/619 |
| 5,709,447 A | * | 1/1998 | Murakami et al. | ............ 362/621 |
| 6,254,245 B1 | * | 7/2001 | Uehara | ....................... 362/609 |
| 6,672,734 B2 | * | 1/2004 | Lammers | ..................... 362/612 |

* cited by examiner

*Primary Examiner*—Bao Q Truong
(74) *Attorney, Agent, or Firm*—Patent Law Group LLP

(57) ABSTRACT

A compact backlight system for illuminating a display device (12) has a light-emitting panel (1) with a front wall (2) and an opposed rear wall (3) and with edge surfaces (4, 5). At least one of the edge surfaces (4) is light-transmitting. The backlight system has a light source (6) comprising a limited number of LEDs. Light from the light source (6) is coupled into the light-emitting panel (1) via the edge surface that is light-transmitting. According to the invention, the light-emitting panel (1) is wedge-shaped, and the surface area $S_i$ of the light-transmitting edge surface (4) and the surface area $S_r$ of the opposite edge surface (5) fulfill the relation: $1<(S_r/S_i)<10$, preferably $1.5<(S_r/S_i)<5$. Light travelling for the first time from the light-transmitting edge surface through the light-emitting panel (1) towards the opposite edge surface (5) cannot be coupled out of the light emitting panel (1).

17 Claims, 2 Drawing Sheets

COMPACT LIGHTING SYSTEM AND DISPLAY DEVICE

BACKGROUND

Field of Invention

The invention relates to a lighting system provided with a light-emitting panel comprising a front wall, a rear wall situated opposite thereto, and furthermore edge surfaces between said front wall and said rear wall, at least one of said edge surfaces of the panel being light-transmitting, at least one light source being associated with the light-transmitting edge surface, and light originating from the light source being incident on the light-transmitting edge surface and spreading in the panel during operation.

The invention also relates to a display device provided with said lighting system.

Such lighting systems are known per se and are also referred to as edge lighting systems. They are used inter alia as backlighting systems in (picture) display devices, for example for TV sets and monitors. Such lighting systems are particularly suitable for use as backlights for non-emissive displays, such as liquid crystal display devices, also referred to as LCD panels, which are used in (portable) computers or (cordless) telephones.

Said display devices usually comprise a substrate provided with a regular pattern of pixels which are each controlled by at least one electrode. The display device utilizes a control circuit to reproduce an image or a data-graphic representation in a relevant area of a (display) screen of the (image) display device. The light originating from the backlight in an LCD device is modulated by means of a switch or modulator, various types of liquid crystal effects being used. In addition, the display may be based on electrophoretic or electromechanical effects.

Such lighting systems are also used as luminaires for general lighting purposes or for shop lighting, for example shop window lighting or lighting of (transparent or semi-transparent) plates of glass or (transparent) synthetic resin on which objects, for example jewelry, are displayed. Such lighting systems are further used as window panes, for example for causing a glass wall to radiate light under certain conditions, or to reduce or block out the view through the window by means of light. A further alternative application is the use of such lighting systems for illuminating advertising boards.

In the lighting systems mentioned in the opening paragraph, the light source used is usually a tubular low-pressure mercury vapor discharge lamp, for example one or several cold-cathode fluorescent lamps (CCFL), and the light emitted by the light source during operation is coupled into the light-emitting panel, which serves as an optical waveguide. This waveguide usually constitutes a comparatively thin and planar panel which is manufactured, for example, from synthetic resin or glass, light being transported through the optical waveguide under the influence of (total) internal reflection.

As an alternative light source, such a lighting system may also be provided with a plurality of optoelectronic elements, also referred to as electro-optical elements, for example electroluminescent elements, for example light-emitting diodes (LEDs). These light sources are usually provided in the vicinity of or tangent to a light-transmitting edge surface of the light-emitting panel, in which case light originating from the light source is incident on the light-transmitting edge surface during operation and spreads in the panel.

A lighting system for illuminating an LCD panel is known from U.S. Pat. No. 5,921,652. The light source used is formed by light-emitting diodes (LEDs) which couple light into a light-emitting panel, also referred to as light pipe, via a so-termed light transition area. The light is mixed in said light transition area.

A lighting system of the above type has the disadvantage that the mixing of light occupies too much space.

SUMMARY

It is an object of the invention to eliminate the above disadvantage wholly or partly.

According to the invention, this object is achieved in that the light-emitting panel widens from the light-coupling edge surface in a direction towards the edge surface situated opposite said light-coupling edge surface, the ratio of the surface area $S_i$ of the light-coupling edge surface and the surface area $S_r$ of the edge surface situated opposite the light-coupling edge surface satisfies the relation:

$$1 < \frac{S_r}{S_i} < 10.$$

Since the light-emitting panel widens from the light-coupling edge surface, the light coupled into the light-emitting panel at the area of the light-coupling edge surface cannot leave the light-emitting panel during its first travel through the light-emitting panel from the light-coupling edge surface. The angular light distribution of light traveling through a light-emitting panel widening from the light-coupling edge surface becomes narrower. Light is collimated in a light-emitting panel which widens. In a light-emitting panel based on total internal reflection (TIR), light having and exceeding the limit angle is not coupled out of the light-emitting panel. In the reverse situation, in which the light travels through a light-emitting panel which narrows, the angular light distribution becomes gradually greater. The moment light within the thus increased angular light distribution will have on reflection an angle below the limit angle, for example in the case of reflection against the front wall or the rear wall of the light-emitting panel, the light is coupled out of the light-emitting panel. Since the light coupled into the light-coupling edge surface cannot leave the light-emitting panel during its first travel through this light-emitting panel, it is promoted that the light during this travel distributes itself in the panel, and also that the light, if originating from two or more, possibly differently colored light sources, is satisfactorily mixed. A good distribution and/or mixing of light promotes the uniformity of the light coupled out of the light-emitting panel. The light-emitting panel acts, as it were, as a light-mixing chamber for light on its first travel through a widening light-emitting panel. In known lighting systems, such a light-mixing chamber is usually provided outside the light-emitting panel, which is why such a light-mixing panel occupies unnecessarily much space. The measure according to the invention, as it were, integrates the light-mixing chamber into the light-emitting panel, which leads to a considerable saving in space.

It is noted that wedge-shaped light-emitting panels are known per se, but such known wedge-shaped light-emitting panels are widest at the area of the edge surface where the light is coupled into the light-emitting panel and narrowest at the area of the edge surface situated opposite the light-coupling edge surface.

Light originating from the light source that is coupled into a light-emitting panel has an angular distribution which varies between approximately +45° and −45° (the angular distribution is dependent on the refraction of light from air to glass or to a transparent synthetic resin). In a light-emitting panel whose thickness increases by, for example, a factor of two in the direction in which the light travels, the variation in the angular light distribution when the light coming from the light-transmitting edge surface arrives at the edge surface situated opposite the light-coupling edge surface has fallen to approximately +23° and −23°. In a light-emitting panel whose thickness increases, for example, by a factor of three, the variation in the angular light distribution when the light originating from the light-transmitting edge surface arrives at the edge surface situated opposite the light-coupling edge surface has fallen to approximately +15° and −15°. The wedge shaped light-emitting panel thus has a collimator function, which is benefical to optimal light-mixing and light-emitting of the panel. Subsequently, the light is reflected at the edge surface situated opposite the light-coupling edge surface, whereupon usually the angular light distribution increases again in dependence on the manner in which the reflection takes place. When the light travels back through the light-emitting panel, the angular light distribution will further increase owing to the fact that the panel narrows. At a certain moment the angular light distribution has become so wide that part of the light has on reflection an angle below the critical angle and issues from the light-emitting panel.

The lower limit for the ratio of the surface area $S_i$ of the light-coupling edge surface and the surface area $S_r$ of the edge surface situated opposite the light-coupling edge surface, $S_r/S_i > 1$, is given by the fact that the light-emitting panel is at least wedge-shaped. The upper limit for the ratio $S_r/S_i < 10$ is determined by the wish that the light-emitting panel should not become too thick. In principle, the dimensions (screen diameter) of, for example, the display device determine the size (diameter) of the light-emitting panel. If the light-coupling edge surface has a thickness of 2 mm, and $S_r/S_i = 10$, then the edge surface situated opposite the light-coupling edge surfaced has a thickness of 20 mm. The ease of manufacture of the light-emitting panel is also reduced in the case of such high ratios.

A particularly compact lighting system is obtained through the measure according to the invention, with a high uniformity of the distribution of the light emitted by the lighting system. By virtue thereof, a more uniform illumination of the display device is achieved in particular in the case of (picture) display devices.

Preferably, the ratio $S_r/S_i$ satisfies the relation:

$$1.5 < \frac{S_r}{S_i} < 5.$$

Light-emitting panels in which the $S_r/S_i$ ratio lies within the preferred range can be readily manufactured in an (injection) molding process. A particularly suitable ratio is $S_r/S_i \approx 2.5$. For example, a suitable thickness of the light-coupling edge surface is 3 mm, which means that for $S_r/S_i = 2.5$ the edge surface situated opposite the light-coupling edge surface will have a thickness of 7.5 mm. An alternative suitable thickness of the light-coupling edge surface is 1 mm, which means that the edge surface situated opposite the light-coupling edge surface will have a thickness of 2.5 mm in the case of $S_r/S_i = 2.5$. Preferably the ratio $S_r/S_i$ satisfies the relation $2.5 \leq 4$, as optimal benefit is achievable from the collimator function of the wedge shape of the light-emitting panel.

A preferred embodiment of the lighting system according to the invention is characterized in that the edge surface situated opposite the light-coupling edge surface is reflecting with respect to light inside the light-emitting panel. Since the first travel of the light originating from the light source through the light-emitting panel serves mainly for uniformly distributing and mixing the light, and the light cannot be coupled out of the light-emitting panel until it has started its return travel through the light-emitting panel, it is important for the light to be reflected at the edge surface situated opposite the light-coupling edge surface.

In a preferred embodiment of the lighting system according to the invention, the edge surface situated opposite the light-coupling edge surface is diffusely reflecting or provided with a diffusely reflecting material. Diffuse reflection promotes the widening of the angular light distribution. The diffusely reflecting material may be, for example, a foil provided on the relevant edge surface.

In an alternative embodiment, the edge surface situated opposite the light-coupling edge surface is specularly reflecting. In a further alternative embodiment of the lighting system according to the invention, the edge surface situated opposite the light-coupling edge surface is faceted. Faceting of the relevant edge surface renders it possible to direct the light in various directions during reflection. Also the angular distribution of the light can be favorably influenced. In a further alternative embodiment of the lighting system, the edge surface situated opposite the light-coupling edge surface encloses an angle with the rear wall of the light-emitting panel which is greater than 90°.

In a preferred embodiment of the lighting system the front wall and the light-transmitting edge surface enclose in side elevation of the light-emitting panel an obtuse angle with a value 90°+β, in which β is a tilt angle over which the light-transmitting edge surface is tilted with respect to a normal of the front wall. In this way a further improvement is achieved in the uniformity of the light coupled out of the light-emitting panel, in particular in the region of the respective edge surface.

By tilting the light-transmitting edge surface light reflecting at this surface after its travel through this light-emitting panel will be for a larger part be reflected in such a direction that it will strike the front wall with angles larger than the limit angle and so be total internal reflected. In this way an additional flux of emitted light from the panel in the region of the light-transmitting edge surface is counteracted.

At the position of the light-transmitting edge surface the front wall and the rear wall enclose a wedge angle α. Preferably the tilt angle β at least has a value of 0.5*α for α≧1°. It appears that the additional flux in general will be less than 30% with respect of the flux far from the edge surface. An even further improvement is achievable when it holds that β≧α for α≧0.3°. The additional flux will be as low as at most 20% for values of α up to 1° and even below 10% for value of α of 1° and over. This is in particular advantageous if the rear wall is free of reflecting material in the region of the light-transmitting edge surface. Herewith the influence on the additional flux of reflection on the rear wall is further reduced.

In the case of small values of the wedge angle α it is advantageous if it holds that β≧1.5–1.4*α for α≦0.5°. In good approximation the additional flux will be limited to 20%. Further reduction of the additional flux to 10% or less is preferably achieved when it holds that β≧1.5–1.4*α for α≦0.5°.

Excellent results with respect to the additional flux reduction are achievable if the tilt angle β is chosen to be 1.4 times the wedge angle α, for values of α of 1° and over or β=1.8α for values of α between 1° and 0.4°.

Values of the wedge angle α less or equal than 0.1° are not practical, as they will in general result in rather large size light-emitting panels to achieve an acceptable degree of light mixing inside the panel.

Advantageously the edge surface situated opposite the light-coupling edge surface and the reflecting material are positioned slightly apart with an air gap in between.

It has appeared that the uniformity is further prompted of the light coupled out of the light-emitting panel, in particular in the region of the respective edge surface. Besides, a greater design freedom exists with respect to the shape of the respective edge surface. The air gap preferable has typically a magnitude of 0.1 mm.

The light source used may be formed by LEDs, for example different types of LEDs and/or LEDs of different colors which are combined with one another. Colors may be mixed in a desired manner through a suitable use of LEDs, for example for making white light of a desired color temperature. For this purpose, an embodiment of the lighting system according to the invention is characterized in that the light source comprises at least two light-emitting diodes with different light emission wavelengths. Preferably, the light source comprises three light-emitting diodes. The LEDs preferably comprise the combinations of red, green, and blue LEDs known per se, or, for example, combinations of red, green, blue, and amber LEDs. LEDs with three light emission wavelengths may also be realized by means of two LEDs with different light emission wavelengths, in which case the LEDs of one of the types are (partly) provided with a phosphor, such that the light emission of the LED is converted by the phosphor to light of a third, desired light emission wavelength. A combination of the combinations of red, green, and blue LEDs known per se, renders it possible to realize color changes independently of the status of the display device. The use of LEDs has the further advantage that dynamic lighting possibilities are obtained. For this purpose, a sensor is present at one of the edge surfaces for measuring the optical properties of the light emitted by the light source during operation.

The quantity of light emitted by the LEDs is adjusted by varying the luminous flux of the light-emitting diodes. This control of the luminous flux usually takes place in an energy-efficient manner. Thus the LEDs can be dimmed without an appreciable loss in efficacy. Preferably, the intensity of the light emitted by the light-emitting diodes is variable in response to the illumination level of a picture to be displayed by the display device or in response to the level of the ambient light. Preferably, the color point of a picture displayed by the display device is determined by the lighting system. An (improved) dynamic range (for example contrast) of the picture to be displayed by the display device is achieved thereby.

Preferably, each of the light-emitting diodes has a luminous flux of at least 5 lm. LEDs with such a high output are also referred to as LED power packages. The use of these high-efficiency, high-output LEDs has the specific advantage that the number of LEDs required for a desired, comparatively high light output can be comparatively small. This benefits the compact construction and the efficiency of the lighting system to be manufactured. Further advantages of the use of LEDs are a comparatively very long useful life, the comparatively low energy cost, and the low maintenance cost for a lighting system with LEDs.

A considerable length is available for mixing the various light colors until the desired color mixture has been reached, for example white light of a predetermined color temperature, in a lighting system with a wedge-shaped light-emitting panel which widens from the light-coupling edge surface and in which the light cannot be coupled out during its first travel through the light-emitting panel. Light-emitting panels of comparatively large dimensions can be realized in this manner with a light source which comprises in total, for example, six or even at most three (high-output) light-emitting diodes with different light emission wavelengths. In the known lighting system, a light-mixing chamber of considerable dimensions is usually necessary for such a limited number of LEDs in order to achieve that the light is sufficiently distributed and mixed in the light-emitting panel so as to provide a uniform and homogeneous output of light from the light-emitting panel in the direction of the (picture) display device.

In a further preferred embodiment, the lighting system comprises control electronics for changing the luminous flux of the light source. The desired lighting effects are achieved by means of suitable control electronics, and the uniformity of the emitted light is improved. Additionally, white light is obtained through a suitable combination of LEDs, with control electronics enabling the desired color temperature to be set.

A particularly compact lighting system is obtained through the measure according to the invention with a high uniformity of the distribution of the light emitted by the lighting system.

BRIEF DESCRIPTION OF THE DRAWINGS

The invention will now be explained in more detail with reference to a number of embodiments and a drawing, in which.

The Figures are purely diagrammatic and not drawn true to scale. Some dimensions are strongly exaggerated for reasons of clarity. Equivalent components have been given the same reference numerals as much as possible in the Figures.

DETAILED DESCRIPTION

Figure 1:
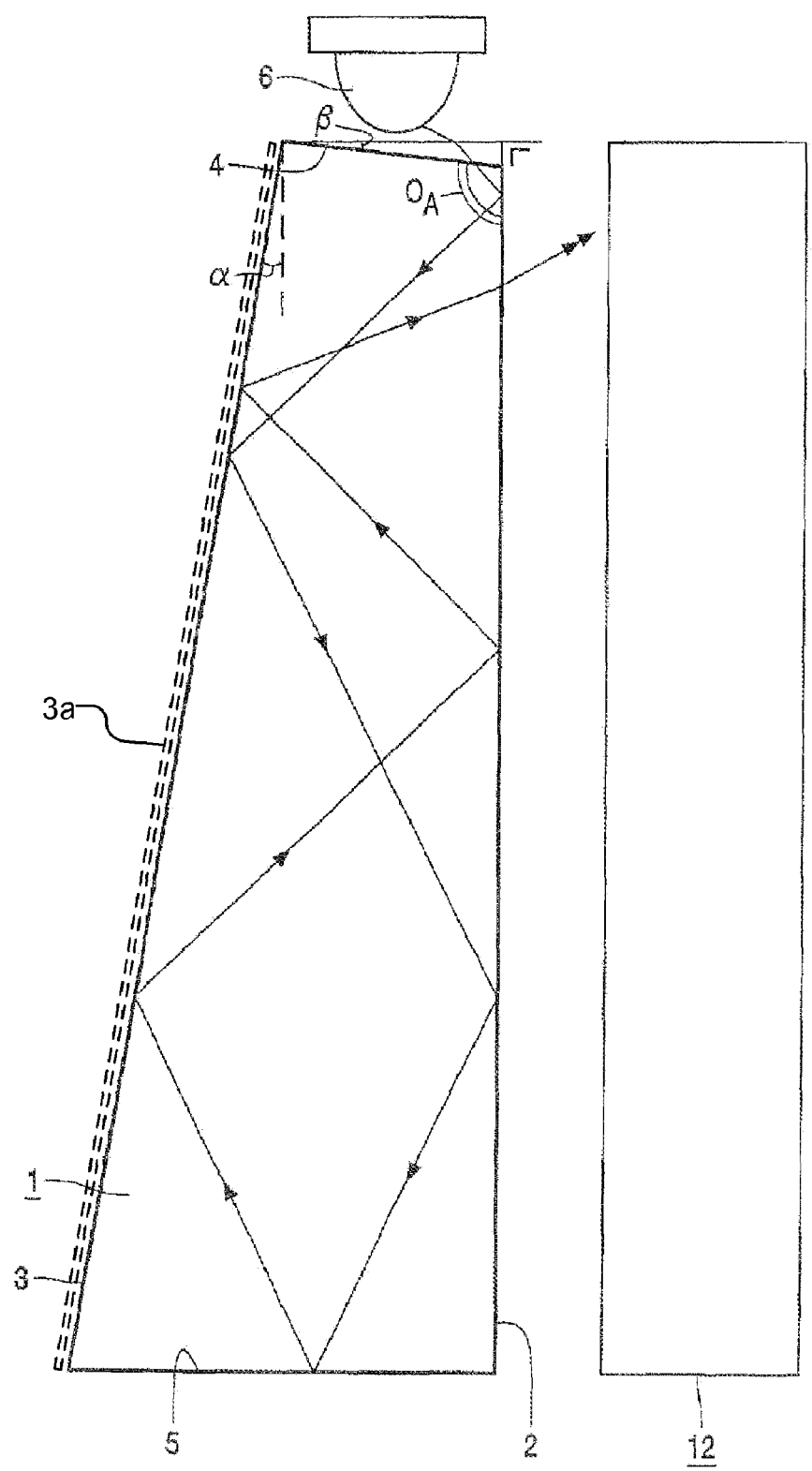
FIG. 1 is a side elevation of a display device comprising an embodiment of the lighting system according to the invention.

FIG. 1 is a diagrammatic side elevation of a display device comprising an embodiment of the lighting system according to the invention. The lighting system comprises a light-emitting panel 1 of a light-transmitting material. The panel 1 is manufactured, for example, from a synthetic resin, from acryl, from polycarbonate, from pmma, for example perspex, or from glass. Light is transported through the panel 1 during operation, utilizing total internal reflection (TIR). The panel has a front wall 2 and a rear wall 3 opposite thereto, which enclose at the position of a light-transmitting edge surface 4 a wedge angle α.

Between the front wall 2 and the rear wall 3 of the light-emitting panel 1, there are also edge surfaces 4, 5, at least one of said edge surfaces 4 being light-transmitting. The front wall 2 and the light-transmitting edge surface 4 enclose in side elevation of the light-emitting panel 1 an obtuse angle OA with a value 90°+β, in which β is a tilt angle over which the light-transmitting edge surface is tilted with respect to a normal of the front wall 2. An improved uniformity of the flux of the light-emitting panel 1 is herewith achievable by counteracting a locally additional flux due to light reflected at the light-transmitting edge surface 4.

Preferably the tilt angle β at least has a value of 0.5*α for α≧1°. It appears that the additional flux in general will be less than 30% with respect of the flux far from the edge surface. Further improvement is achievable when it holds that β≧α for α≧0.3°.

In the case of small values of the wedge angle α it is advantageous if it holds that β≧1.5−1.4*α for α≦0.5°. In good approximation the additional flux will be limited to 20%. Further reduction of the additional flux to 10% or less is preferably achieved when it holds that it β≧1.5−1.4*α for a α≦0.5°.

Excellent results with respect to the additional flux reduction are achievable if the tilt angle β is chosen to be 1.4 times the wedge angle α, for values of α of 1° and over or β=1.8α for values of α between 1° and 0.4°.

The lighting system comprises a light source 6, for example a number of light-emitting diodes (LEDs). In the situation shown in FIG. 1, light originating from the light source 6 is incident on the light-coupling edge surface 4 of the light-emitting panel 1 during operation, which light distributes itself in the light-emitting panel 1. According to the measure of the invention, the light-emitting panel 1 widens from the light-coupling edge surface 4 in a direction towards the edge surface 5 situated opposite the light-coupling edge surface 4, the ratio of the surface area $S_i$ of the light-coupling edge surface 4 and the surface area $S_r$ of the edge surface 5 situated opposite the light-coupling edge surface 4 complying with the relation:

$$1 < \frac{S_r}{S_i} < 10.$$

FIG. 1 diagrammatically depicts a radiation path from the light source 6. Light coming from the light source 6 that is coupled into the light-emitting panel 1 has an angular distribution which varies between approximately +45° and −45° (the angular distribution is dependent on the refraction of light from air to glass or to a transparent synthetic resin). Owing to total internal reflection, the light coming from the light source 6 is reflected at the front wall 2 and the rear wall 3 of the light-emitting panel 1, while it is impossible for the light to be coupled out because the light-emitting panel 1 widens, i.e. the angle of incidence (with respect to the normal to the front wall 2 or the rear wall 3) is greater than a critical angle. Indeed, since the light-emitting panel 1 widens from the light-coupling edge surface 4, consecutive angles of incidence become increasingly greater. Thus the light-emitting panel has a collimator function. Subsequently, the light is reflected at the edge surface 5 situated opposite the light-coupling edge surface 4. On its return travel through the light-emitting panel 1, the light is confronted with a light-emitting panel 1 which narrows. As a result, the angle of incidence with respect to the normal decreases gradually for consecutive reflections at the front wall 2 or the rear wall 3, until the moment comes when the angle of incidence is smaller than the critical angle, whereupon the light is coupled out of the light-emitting panel 1. This situation is diagrammatically indicated by means of arrows in FIG. 1.

Since the light-emitting panel widens from the light-coupling edge surface 4, according to the invention, the light cannot leave the light-emitting panel 1 during its first travel from the light-coupling edge surface 4 through the light-emitting panel 1. It is promoted thereby that the light on its first travel through the light-emitting panel 1 distributes itself and is mixed in the light-emitting panel 1. A good distribution and/or mixing of light promotes the uniformity and the homogeneity of the light coupled out of the light-emitting panel 1. The light-emitting panel 1 serves, as it were, as a light-mixing chamber for light during its first travel through a widening light-emitting panel. According to the measure of the invention, the light-mixing chamber is, as it were, integrated into the light-emitting panel, which leads to a considerable saving in space.

A particularly compact lighting system is obtained through the measure according to the invention, with a high uniformity of the distribution of the light emitted by the lighting system. A more uniform illumination of the (picture) display device is realized thereby.

The light-emitting panel 1 emits light in the direction of the display device during operation, for example a liquid crystal display (LCD) device 12. The assembly of the light-emitting panel 1, the light source 6, and the LCD device 12, whether or not accommodated in a housing (not shown in FIG. 1), forms a display device for displaying, for example, (video) images.

The light-emitting panel 1 may further be provided with a sensor (not shown in FIG. 1) for measuring the optical properties of the light. This sensor is coupled to control electronics (not shown in FIG. 1) for suitably adapting the luminous flux of the light source 6. By means of the sensor and the control electronics, a feedback mechanism can be realized for influencing the quality and quantity of the light coupled out of the light-emitting panel 1.

Preferably, the $S_r/S_i$ ratio fulfills the relation:

$$1.5 < \frac{S_r}{S_i} < 5.$$

Light-emitting panels in which the $S_r/S_i$ ratio lies within the preferred range can be readily manufactured in an (injection) molding process. A particularly suitable range of the ratio is $2.5 \leq S_r/S_i \leq 4$, as it makes optimal use of the collimator function of the light-emitting panel possible.

Figure 2:
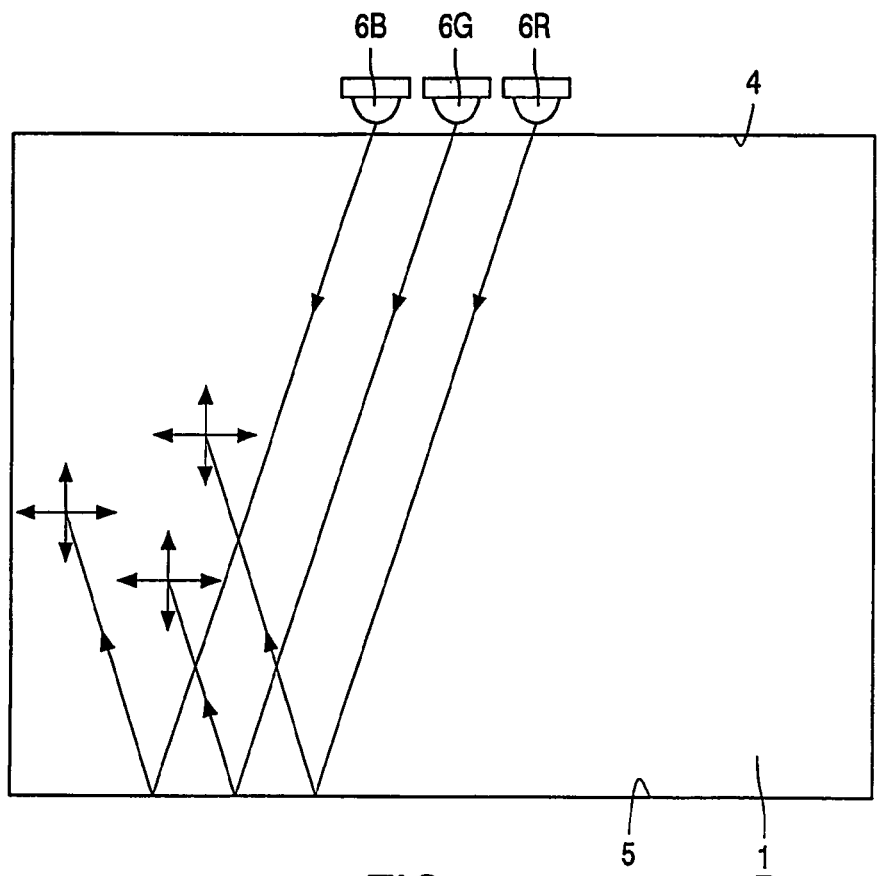
FIG. 2 is a cross-sectional view of the lighting system of FIG. 1.

FIG. 2 is a diagrammatic cross-sectional view of the lighting system of FIG. 1. The light source in this example comprises three light-emitting diodes (LEDs) 6B, 6G, 6R with, respectively, a blue, a green, and a red light emission wavelength. The source brightness of an LED is usually many times higher than that of a fluorescent tube. Furthermore, the efficiency with which light is coupled into the panel with the use of LEDs is greater than with the use of fluorescent tubes. The use of LEDs as a light source has the advantage that the LEDs may lie against panels made from synthetic resin. LEDs transmit hardly any heat in the direction of the light-emitting panel 1, nor do they generate detrimental (UV) radiation. The use of LEDs in addition has the advantage that no means need be applied for coupling the light originating from the LEDs into the panel. The LEDs in the lighting system may comprise suitably chosen clusters of blue, green, and red LEDs, or suitable alternative combinations of single-color or dual-color LEDs, or a plurality of white LEDs with a high luminous flux.

FIG. 2 highly diagrammatically indicates that light originating from the LEDs 6B, 6G, 6R and coupled in at the area of the light-coupling edge surface 4 cannot be coupled out during its first travel through the light-emitting panel 1. It is not until after the light has been reflected at the edge surface 5 situated opposite the light-coupling edge surface 4 that the critical angle can be exceeded by the light upon its reflection against the front wall or against the rear wall, whereupon the light will be coupled out of the light-emitting panel 1 in the direction of the display device.

The LEDs 6B, 6G, 6R used in the lighting system are preferably LEDs which each have an optical power of at least 50 mW. LEDs with such a high output are also referred to as LED power packages. Examples of power LEDs are LEDs of the "Luxeon™" type (Lumileds) whose luminous flux per LED is 35 lm for red, 20 lm for green, 8 lm for blue and 40 lm for amber LEDs. In alternative embodiments, yellow, amber, cyan, magenta, and/or purple LEDs are also used which have a comparatively high light output (whether or not with the aid of two spectral light emission wavelengths). It is also possible to use a plurality of white LEDs having a high luminous flux. In further alternative embodiments, red LEDs may be used in combination with blue LEDs which are provided with a phosphor, such that the latter emit in two spectral bands, i.e. a blue and a green band.

Preferably, the LEDs are mounted on a (metal-core) printed circuit board. When power LEDs are provided on such a (metal-core) printed circuit board (PCB), the heat generated by the LEDs can be readily removed by the PCB through thermal conduction. An interesting embodiment of the lighting system is furthermore one in which the (metal-core) printed circuit board is in contact with the housing of the display device via a thermally conducting connection.

The edge surface 5 situated opposite the light-coupling edge surface is preferably reflecting with respect to light in the light-emitting panel 1. To influence the angular distribution of the light traveling through the light-emitting panel 1 during reflection, the edge surface 5 situated opposite the light-coupling edge surface 4 is preferably diffusely reflecting, or it is preferably provided with a diffusely reflecting material.

Figure 3:
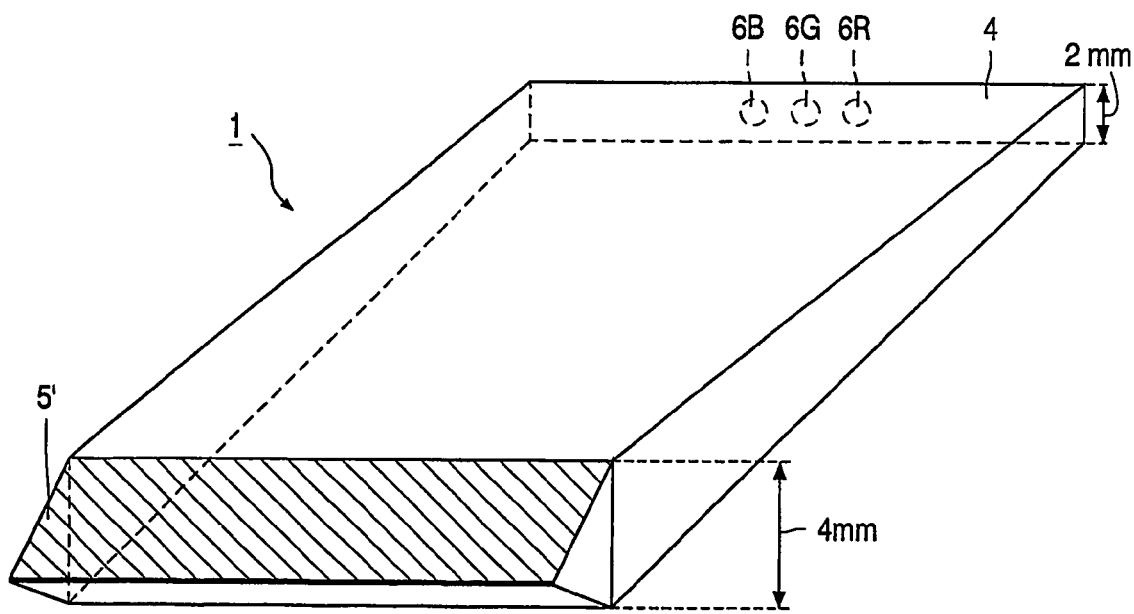
FIG. 3 is a side elevation of an alternative embodiment of the light-emitting panel.

In an alternative embodiment of the light-emitting panel, the edge surface situated opposite the light-coupling edge surface 4 is faceted. An example of this is shown in FIG. 3, which is a diagrammatic side elevation of an alternative embodiment of the light-emitting panel. The edge surface 5' situated opposite the light-coupling edge surface 4 is not arranged so as to be parallel to the light-coupling edge surface 4. The edge surface in FIG. 3 is provided with a specular reflector by way of example, for example a metal reflector. Arranging said edge surface 5' at a suitable angle is done to optimize the angle at which the light is coupled out of the light-emitting panel 1.

In a further alternative embodiment of the lighting system, the rear wall 3 of the light-emitting panel 1 is diffusely reflecting or is provided with a diffusely reflecting material 3a as indicated with dotted lines. This is done to promote the coupling-out of light from the light-emitting panel.

With advantage the reflecting material 3a is positioned slightly apart of the rear wall with an air gap in between. In this way maximum use is made of reflecting based on total internal reflection (TIR). The air gap preferably has a magnitude of typically 0.1 mm.

It will be obvious that many modifications are possible to those skilled in the art within the scope of the invention.

The scope of protection of the invention is not limited to the embodiments given. The invention resides in each novel characteristic and each combination of characteristics. Reference numerals in the claims do not limit the scope of protection thereof. The use of the verb "comprise" and its conjugations does not exclude the presence of elements other than those specified in the claims. The use of the indefinite article "a" or "an" preceding an element does not exclude the presence of a plurality of such elements.

The invention claimed is:

1. A lighting system provided with a light-emitting panel comprising:
a front wall, a rear wall situated opposite thereto, and furthermore edge surfaces between said front wall and said rear wall wherein:
at least one of said edge surfaces of the panel is light-transmitting,
at least one light source is associated with the light-transmitting edge surface,
light originating from the light source is incident on the light-transmitting edge surface and distributes itself in the panel during operation,
the light-emitting panel widens from the light-transmitting edge surface in a direction towards a reflecting edge surface situated opposite said light-transmitting edge surface, the reflecting edge surface situated opposed said light-transmitting edge surface being planar, and
a ratio of a surface area $S_i$ of the light-transmitting edge surface to a surface area $S_r$ of the reflecting edge surface situated opposite the light-transmitting edge surface satisfies:

$$1 < \frac{S_r}{S_i} < 10.$$

2. The lighting system as claimed in claim 1, wherein the ratio $S_r/S_i$ satisfies:

$$1.5 < \frac{S_r}{S_i} < 5.$$

3. The lighting system as claimed in claim 2, wherein the ratio $S_r/S_i$ satisfies:

$$2.5 < \frac{S_r}{S_i} < 4.$$

4. The lighting system as claimed in claim 1, wherein the reflecting edge surface situated opposite the light-transmitting edge surface is reflecting with respect to light inside the light-emitting panel.

5. The lighting system as claimed in claim 4, wherein the reflecting edge surface situated opposite the light-transmitting edge surface is diffusely reflecting or is provided with a diffusely reflecting material.

6. The lighting system as claimed in claim 1, wherein the front wall and the light-transmitting edge surface enclose in side elevation of the light-emitting panel an obtuse angle with a value 90°+β in which β is a tilt angle over which the light-transmitting edge surface is tilted with respect to a normal of the front wall.

7. The lighting system as claimed in claim 6, wherein at a position of the light-transmitting edge surface the front wall and the rear wall enclose a wedge angle α, and wherein the tilt angle β at least has a value of 0.5*α for α≧1°.

8. The lighting system as claimed in claim 7 wherein β≧α for α≧0.3°.

9. The lighting system as claimed in claim 8, wherein the rear wall is free of reflecting material in a region adjacent the light-transmitting edge surface.

10. The lighting system as claimed in claim 7 wherein β≧1.5-1.4*α for α≧0.5°.

11. The lighting system as claimed in claim 7 wherein β≧1.5-1.4*α for α≧0.5°.

12. The lighting system as claimed in claim 1, wherein the rear wall of the light-emitting panel is diffusely reflecting or is provided with a diffusely reflecting material.

13. The lighting system as claimed in claim 12, wherein the reflecting material is positioned slightly apart with an air gap between the reflecting material and rear wall.

14. The lighting system as claimed in claim 1, wherein the light source comprises at least two light-emitting diodes with different light emission wavelengths.

15. The lighting system as claimed in claim 14, wherein each of the light-emitting diodes has a luminous flux of at least 5 lm.

16. A display device provided with the lighting system as claimed in claim 1.

17. The display device as claimed in claim 16, which display device comprises a liquid crystal display.

* * * * *

UNITED STATES PATENT AND TRADEMARK OFFICE
CERTIFICATE OF CORRECTION

| | | |
|---|---|---|
| PATENT NO. | : 7,364,343 B2 | Page 1 of 1 |
| APPLICATION NO. | : 10/497481 | |
| DATED | : April 29, 2008 | |
| INVENTOR(S) | : Matthijs Hendrik Keuper and Robert Frans Maria Hendriks | |

It is certified that error appears in the above-identified patent and that said Letters Patent is hereby corrected as shown below:

Column 11, line 17, claim 10: Cancel "$\alpha \geq 0.5°$" and substitute --$\alpha \leq 0.5°$--.

Column 11, line 19, claim 11: Cancel "$\alpha \geq 0.5°$" and substitute --$\alpha \leq 0.5°$--.

Signed and Sealed this

Fourteenth Day of October, 2008

JON W. DUDAS
*Director of the United States Patent and Trademark Office*